(12) United States Patent
Kikuchi

(10) Patent No.: US 6,519,373 B1
(45) Date of Patent: Feb. 11, 2003

(54) IMAGE PROCESSING APPARATUS

(75) Inventor: Hiroaki Kikuchi, Ashigarakami-gun (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/391,629

(22) Filed: Sep. 7, 1999

(30) Foreign Application Priority Data

Sep. 7, 1998 (JP) ............................................ 10-252718

(51) Int. Cl.⁷ .................................................. G06K 9/32
(52) U.S. Cl. ...................................... 382/297; 382/305
(58) Field of Search ................................ 382/297, 296, 382/295, 294, 293, 305, 398, 312; 358/400, 488, 1.2; 355/110, 126

(56) References Cited

U.S. PATENT DOCUMENTS 4,965,871 A * 10/1990 Ogura et al. .................. 355/55
6,028,968 A * 2/2000 Kurita et al. ................ 382/298
6,069,983 A * 5/2000 Otaki ......................... 382/296

* cited by examiner

Primary Examiner—Bhavesh Mehta
Assistant Examiner—Kanji Patel
(74) Attorney, Agent, or Firm—Birch, Stewart, Kolasch & Birch, LLP

(57) ABSTRACT

An image processing apparatus determines whether the longitudinal direction of an image area which is represented by image data inputted in an image processing section and the longitudinal direction of a recording area are correspondent with each other, and then rotates the image by 90 degrees when it is determined that the longitudinal direction of the image area and the longitudinal direction of the recording area are not correspondent with each other.

14 Claims, 4 Drawing Sheets

IMAGE PROCESSING APPARATUS

BACKGROUND OF THE INVENTION

1. Field of the Invention

The present invention relates to an image processing apparatus.

2. Description of the Related Art

Conventionally, there has been known an image processing system which can output images in various output forms, such as recording the images on a recording material such as photographic printing paper, displaying the images on a displaying means such as a display unit, or storing the image data in an information recording medium such as a CD-ROM, after various image processings are performed on the image data obtained by reading film images recorded on a photographic film with a CCD or the like, or on the image data inputted from a digital camera or the like.

In accordance with this image processing system, the quality of output images can be freely controlled by the system's image processing of image data, as compared with a conventional photographic processing system in which film images are recorded on a photographic printing paper by plane exposing (analog exposing). Thus, high-quality output images can be achieved.

When image data subjected to various correcting processings is recorded on a recording material as an image in this type of image processing system, herein assuming, for example, that the horizontal dimension of a set recording area 110 is x and the vertical dimension thereof is y, and that the horizontal dimension of an image area 112 is a and the vertical dimension thereof is b, as shown in FIG. 4A, then in the case where y<b, i.e., the vertical dimension b of the image area 112 is larger than the vertical dimension y of the recording area 110, as shown in FIG. 4B, the whole image area 112 is not contained in the recording area 110. Therefore, only the portion of the image area 112 which can be contained in the recording area 110 is recorded, and the whole image represented by the image data cannot be recorded. The same result occurs when x<a, i.e., the horizontal dimension a of the image area 112 is larger than the horizontal dimension x of the recording area 110.

In order to prevent this, an operator verifies whether the longitudinal direction of the image area and the longitudinal direction of the set recording area are correspondent with each other by outputting image on a monitor or the like, and then if the longitudinal directions thereof are not correspondent with each other, the operator performs processing, for example, to adjust the image so that the orientation thereof is changed by issuing an instruction to rotate the image area, or as shown in FIG. 4C, to adjust the image so that the image is reduced (compressed) so that the vertical dimension of the image area is correspondent with the vertical dimension of the recording area, or reduced so that the horizontal dimension of the image area is correspondent with the horizontal dimension of the recording area.

However, there is a disadvantage that the operation for each of a large amount of image data to be processed, in which the operator verifies whether the longitudinal direction of the image area and the longitudinal direction of the set recording area are correspondent with each other, and then instructs whether or not the orientation of the image area is to be changed, is very troublesome and inefficient.

Further, when processing, such as reducing the vertical dimension of the image area in correspondence with the vertical dimension of the recording area, or reducing the horizontal dimension of the image area in correspondence with the horizontal dimension of the recording area, is performed, as shown in FIG. 4C, there is a disadvantage that the area occupied by margins in the recording area is large, and the area occupied by the image area in the recording area is considerably small, and as a result, the image is smaller than necessary.

SUMMARY OF THE INVENTION

As described above, it is an object of the present invention to provide an image processing apparatus, in which image data can be outputted so that the longitudinal direction of the image area, which is represented by the image data, is correspondent with the longitudinal direction of the preset recording area.

In order to attain the above object, an image processing apparatus according to a first aspect of the present invention comprises determining means, which compares dimensions of an image represented by inputted image data, the dimensions being obtained on the basis of the number of pixels in the vertical direction and the number of pixels in the horizontal direction of the image data, with dimensions of a preset recording area for recording the image, and determines whether a longitudinal direction of an area of the image represented by the image data and a longitudinal direction of the recording area are correspondent with each other; and image rotating means, which rotates the image so that the longitudinal directions are correspondent with each other, when it is determined by the determining means that the longitudinal direction of the area of the image and the longitudinal direction of the recording area are not correspondent with each other.

In accordance with the first aspect of the present invention, the determining means determines whether the longitudinal direction of the area occupied by the image represented by the image data (i.e., the image area) is correspondent with the longitudinal direction of the recording area, based on the dimensions of the image represented by the image data (The dimensions are obtained on the basis of the number of pixels in the vertical direction and the number of pixels in the horizontal direction of the image data.) and the dimensions of the recording area. It is the same in determining whether a direction which is vertical to the longitudinal direction of the image area and a direction which is vertical to the longitudinal direction of the recording area are correspondent with each other. Accordingly, the present invention includes determining whether the directions each of which is vertical to each of the longitudinal direction are correspondent with each other.

When it is determined by the determining means that the longitudinal direction of the image area is not correspondent with the longitudinal direction of the recording area, the image rotating means performs conversion in which the image area is rotated so that the longitudinal direction thereof is correspondent with the longitudinal direction of the recording area. As for the amount of the rotation of an image, in the present invention, it is sufficient if, by rotating the image area, the longitudinal direction of the image area is made substantially parallel to the longitudinal direction of the recording area. For example, if the image area is rotated so that the longitudinal direction thereof and the longitudinal direction of the recording area are correspondent with each other when the longitudinal direction of the image area and the direction which is vertical to the longitudinal direction of the recording area are correspondent with each other, as shown in FIG. 4, if the image area is contained in the recording area, the longitudinal direction of the image area and the longitudinal direction of the recording area need not be completely parallel to each other.

Preferably, the resultant image is rotated by 90 degrees, by outputting the image data, which has been read in the vertical direction, in the horizontal direction, or on the contrary, by outputting the image data, which has been read in the horizontal direction, in the vertical direction. This ensures that the image data can be outputted so that the longitudinal direction of the image area and the longitudinal direction of the recording area are correspondent with each other.

An image processing apparatus according to a second aspect of the present invention comprises determining means, which compares dimensions of an image area of an image represented by inputted image data with dimensions of a preset recording area for recording the image, and determines whether the dimension of a longitudinal-direction of the image area and the dimension of a longitudinal direction of the recording area are correspondent with each other; and outputting means, which outputs the image so that the dimension of the longitudinal direction of the image area and the dimension of the longitudinal direction of the recording area are correspondent with each other, when it is determined by the determining means that the dimension of the longitudinal direction of the image area and the dimension of the longitudinal direction of the recording area are not correspondent with each other.

DESCRIPTION OF THE PREFERRED EMBODIMENTS

Figure 1:
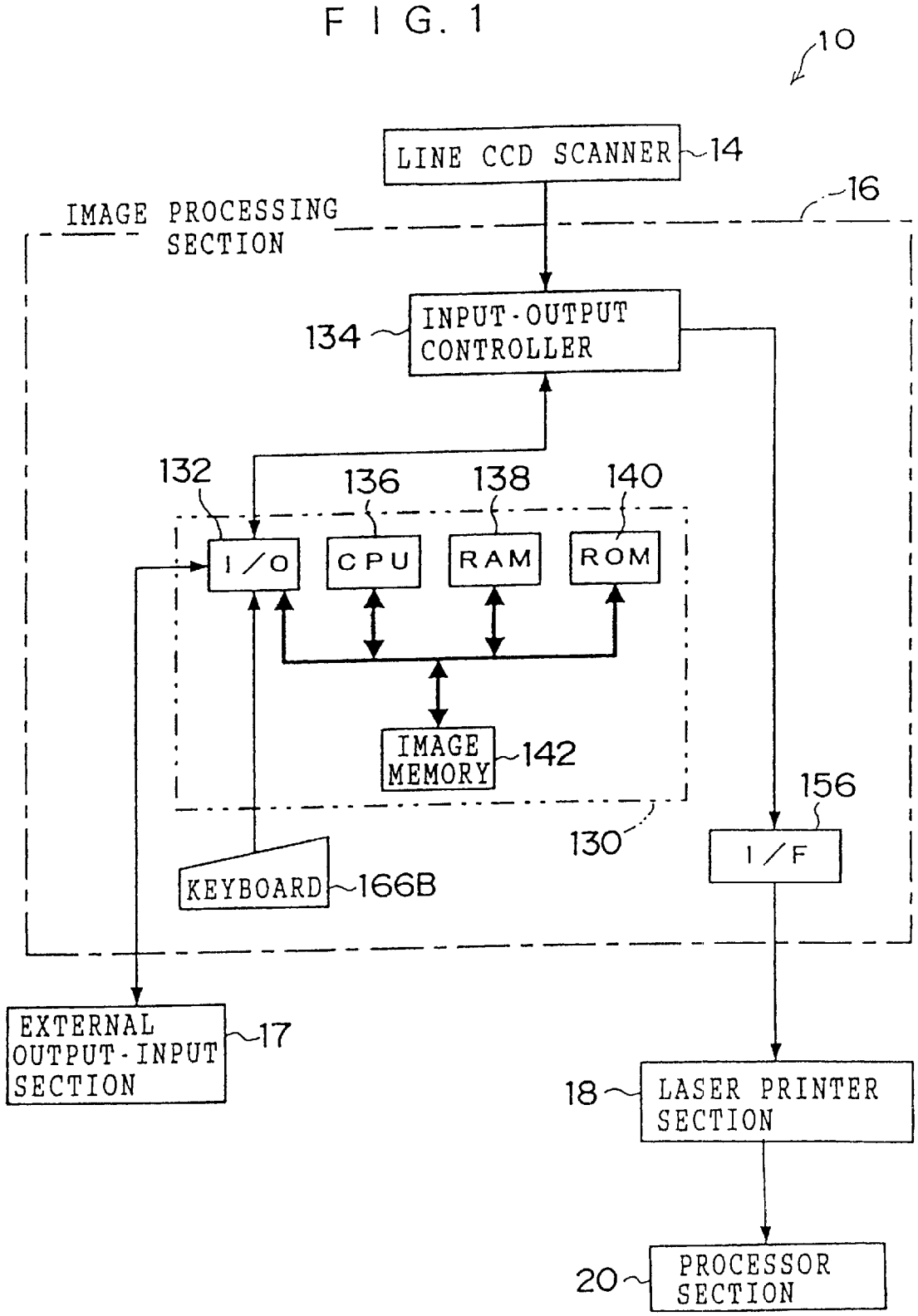
FIG. 1 is a schematic block diagram of a digital laboratory system of an embodiment of the present invention.
Figure 2:
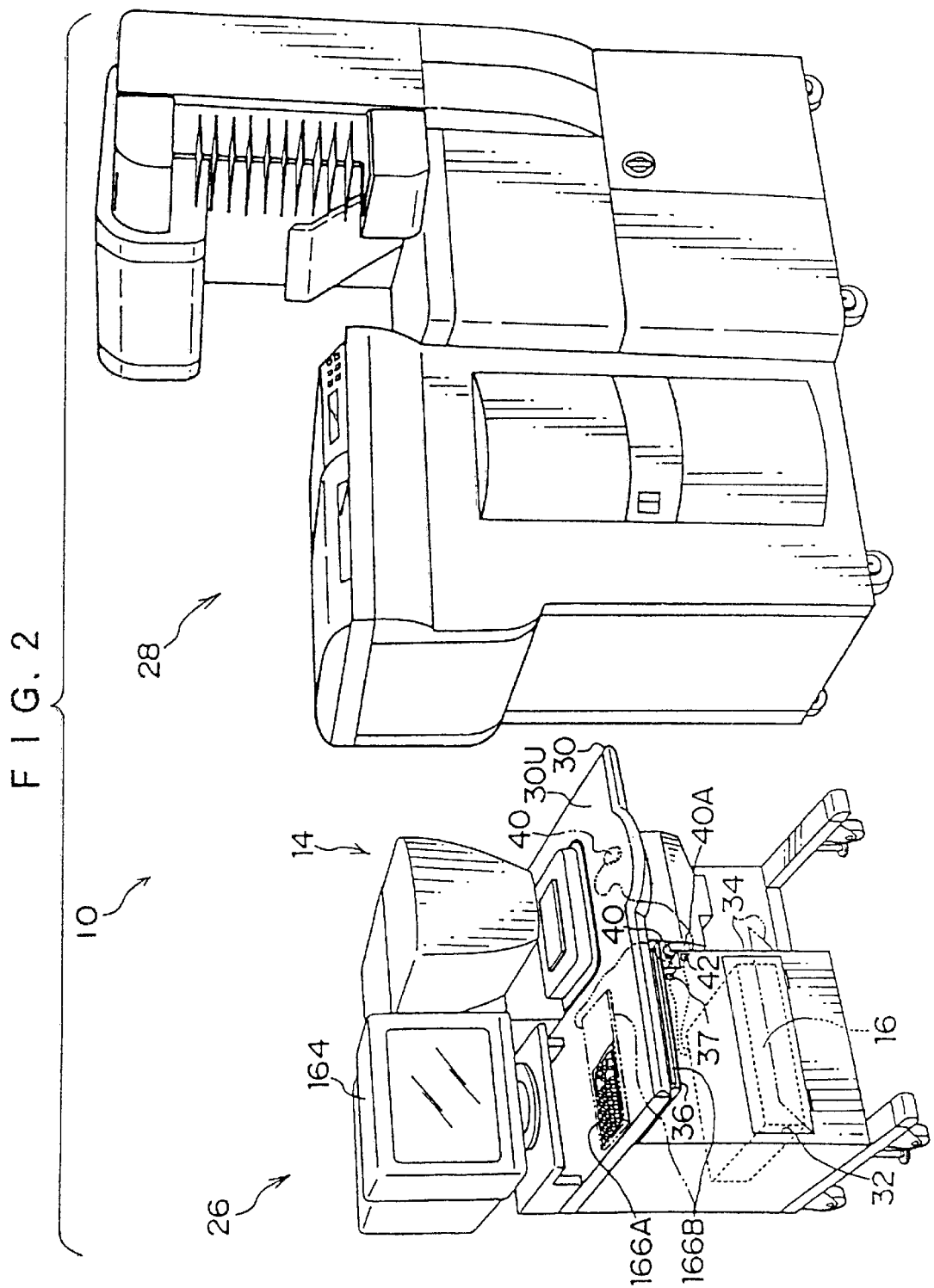
FIG. 2 is an external view of the digital laboratory system according to the embodiment of the present invention.

Hereinafter, referring to the drawings, embodiments of the present invention will be described in detail. Initially, a digital laboratory system, which is structured to include an image processing apparatus according to an embodiment of the present invention, will be described. Schematic structure of the entire system:

FIG. 1 shows a schematic structure of the digital laboratory system 10 according to the present embodiment, and FIG. 2 shows an external appearance of the digital laboratory system 10. As shown in FIG. 1, the laboratory system 10 is structured to include a line CCD scanner 14, an image processing section 16, a laser printer section 18 and a processor section 20. The line CCD scanner 14 and the image processing section 16 are integrated to form an input section 26 shown in FIG. 2, and the laser printer section 18 and the processor section 20 are integrated to form an output section 28 shown in FIG. 2.

The line CCD scanner 14 is used to read film images (i.e., negative images or positive images visualized by developing processing after photographing objects) recorded on a photosensitive material (hereinafter, the material will be simply referred to as a "photographic film") such as a photographic film (for example, a negative film or a reversal film). Examples of the photographic film on which film images to be read are recorded include a photographic film in 135 magazines, a photographic film in 110 magazines, a photographic film with a transparent magnetic layer formed thereon (i.e., a photographic film in 240 magazines: a so-called APS film), and photographic films in 120 magazines and in 220 magazines (Brownie sizes). The line CCD scanner 14 reads the film images to be read recorded on the above photographic films by a three-line color CCD, and outputs image data of R, G, and B.

As shown in FIG. 2, the line CCD scanner 14 is mounted on a working table 30. The image processing section 16 is contained in a containing section 32 which is formed beneath the working table 30. An opened-closed door 34 is attached to an aperture of the containing section 32. The inside of the containing section 32 is normally concealed by the opened-closed door 34. When the opened-closed door 34 is opened, the inside of the containing section 32 is exposed, and thus the image processing section 16 can be ejected.

Further, on the working table 30, a display unit 164 is mounted on the back side thereof, and two types of keyboards 166A and 166B are also set together. One keyboard 166A is embedded in the working table 30. The other keyboard 166B is contained in a drawer 36 of the working table 30 when it is not being used, and the keyboard 166B is pulled out from the drawer 36 and is overlaid on the keyboard 166A when it is being used. When the keyboard 166B is used, a connector (not illustrated) which is attached to the end of a cord (a signal conductor) extending from the keyboard 166B is connected to a jack 37 provided in the working table 30, with the result that the keyboard 166B is electrically connected with the image processing section 16 via the jack 37.

Moreover, a mouse 40 is disposed on a working plane 30U of the working table 30. A cord (a signal conductor) extends from the mouse 40 into the containing section 32 through a hole 42 formed in the working table 30, and is connected with the image processing section 16. The mouse 40 is contained in a mouse holder 40A when it is not being used, and the mouse 40 is pulled out from the mouse holder 40A and is disposed on the working plane 30U when it is being used.

The image processing section 16 includes an input-output controller 134 to which image data (scan data) outputted from the line CCD scanner 14 and image data, which has undergone various processings by the processing portion 130 described below, are inputted; a processing portion 130 which performs various correcting processings on image data inputted from the input-output controller 134 and determines whether images represented by the obtained image data need to be rotated; and an interface 156 which outputs image data outputted from the input-output controller 134 to the laser printer section 18.

The processing portion 130 consists of a CPU 136, a RAM 138 (for example, DRAM), a ROM 140 (for example, a ROM whose stored contents are rewritable), an I/O port 132 and an image memory 142. The image memory 142 is structured so that image data (scan data) outputted from the line CCD scanner 14 can be inputted via the input-output controller 134 and the I/O port 132 and then stored, and so that, for example, image data obtained by photographing using a digital camera, image data obtained by reading an original other than a film image (for example, a reflection original) with a scanner, image data generated by a computer, or other image data (hereinafter, these image data will all be generically referred to as file image data) can be inputted from an external output-input section 17 via the I/O port 132 (for example, via a storage medium such as a memory card, or from other information processing equipment via a communication line) and then stored.

The image processing section 16 performs various correcting processings on the inputted image data including, for example, enlargement/reduction of images, gradation conversion, color conversion, hyper-tone processing in which the gradation of ultra low-frequency luminance components of images is compressed, and hyper-sharpness processing in which sharpness is highlighted while graininess is suppressed. After that, the image processing section 16 determines whether images represented by the image data need to be rotated.

When executing rotating processing, the image processing section 16 fetches image data from the image memory 142, adjusts the fetched image data so that an image represented by the fetched image data pivots by 90 degrees around the central position of the image, and stores the adjusted image data in the image memory 142. The image data stored in the image memory 142 is outputted from the I/O port 132 to the input-output controller 134, and then outputted to the laser printer section 18 via the interface 156 as recording image data.

The laser printer section 18 includes laser light sources of R, G and B, and irradiates laser light modulated in accordance with the recording image data inputted from the image processing section 16 onto photographic printing paper, and records images on the photographic printing paper by scan exposure. The processor section 20 performs various processings including color development, bleach-fixing, rinsing and drying on the photographic printing paper on which images are recorded by scan exposure in the laser printer section 18. As a result, images are formed on the photographic printing paper.

Figure 3:
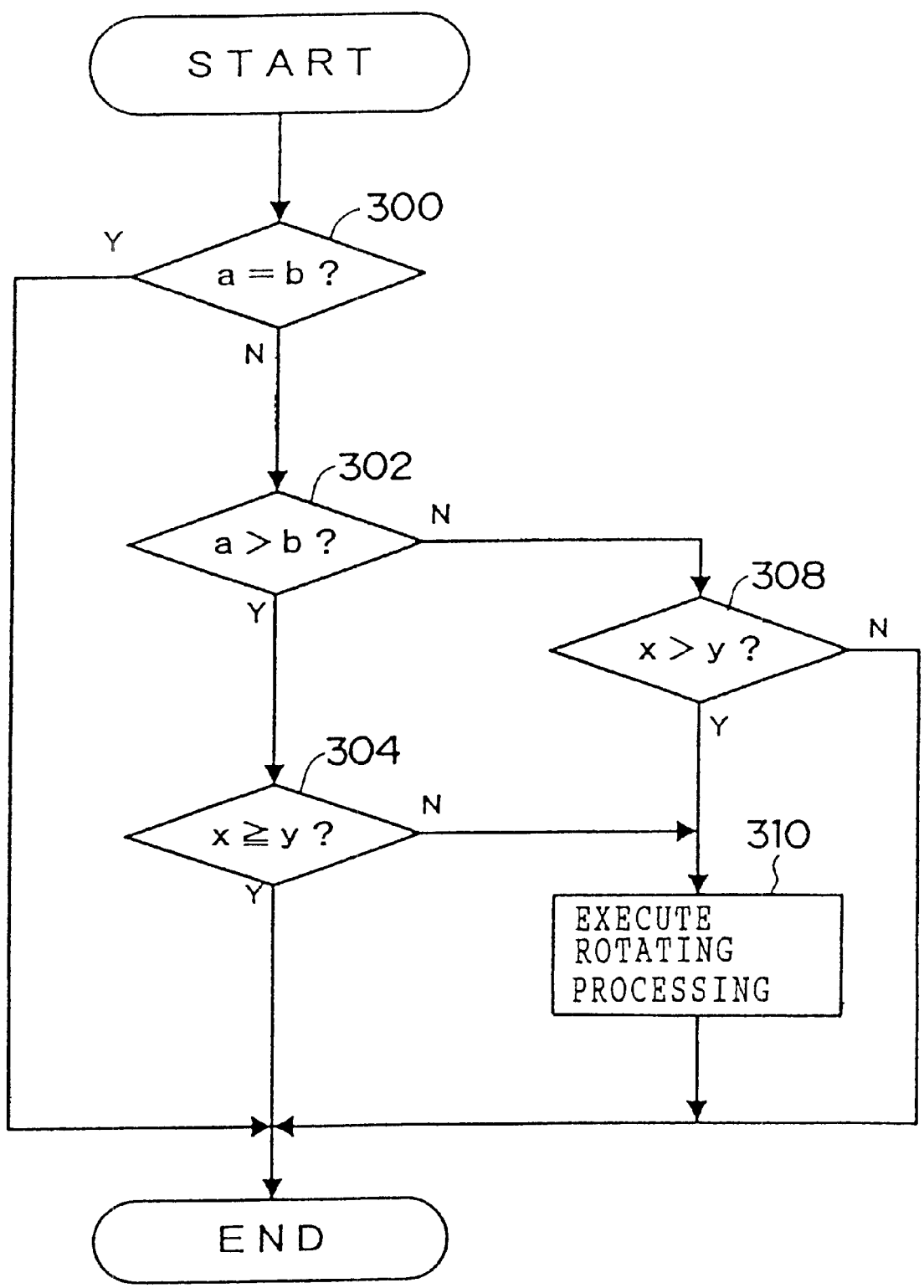
FIG. 3 is a flow chart showing a determining processing routine in an image processing section of the digital laboratory system shown in FIG. 1.
Figure 4A:
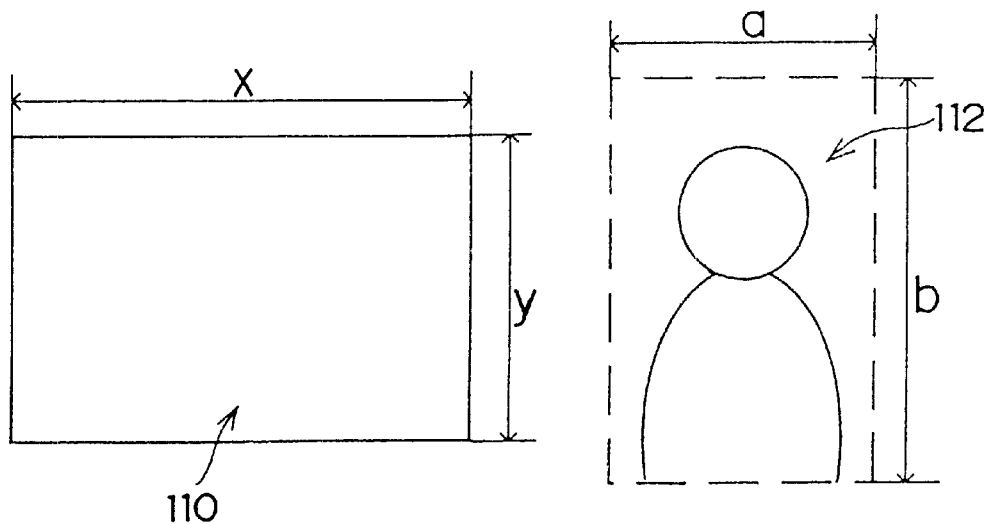
FIGS. 4A, 4B and 4C are an explanatory view showing an example of relationships between dimensions (x, y) of a recording area 110 and dimensions (a, b) of an image area 112.
Figure 4B:
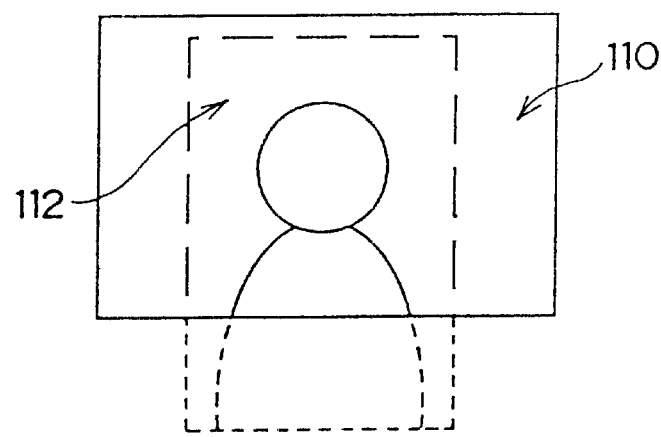
Figure 4C:
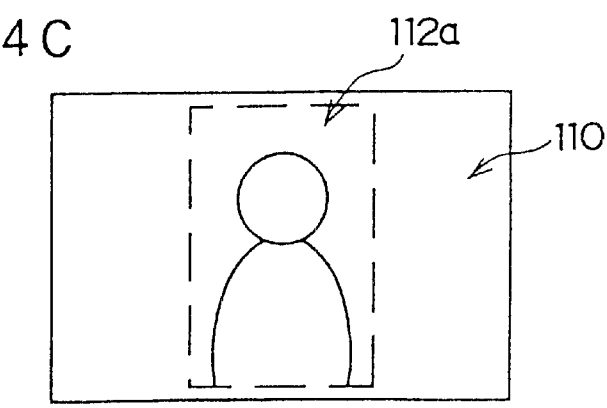

Next, referring to FIG. 3 and FIG. 4, a processing routine which is performed in the image processing section 16 when inputting image data formed using a digital camera or the like from the external output-input section 17 and then transmitting the image data to the image processing section 16 will be described. First, in step 300, horizontal dimension a and vertical dimension b of an image area 112 are calculated from the number of pixels in the horizontal direction and the number of pixels in the vertical direction of the image which is represented by image data subjected to various correcting processings. It is then determined whether the horizontal dimension a and the vertical dimension b are not identical (i.e., a b).

In step 300, if it is determined that the horizontal dimension a and the vertical dimension b of the image area 112 are identical (i.e., the image area 112 is square), the determining processing is ended. In step 300, if it is determined that the horizontal dimension a and the vertical dimension b of the image area 112 are not identical, the routine proceeds to step 302 and it is determined whether the horizontal dimension a of the image area 112 is larger than the vertical dimension b thereof.

In step 302, if it is determined that the horizontal dimension a of the image area 112 is larger than the vertical dimension b thereof (i.e., a>b), the routine proceeds to step 304 and it is determined whether or not the horizontal dimension x of a recording area 110 is equal to or larger than the vertical dimension y thereof (i.e., x≧y). In step 304, if it is determined that the horizontal dimension x of the recording area 110 is equal to or larger than the vertical dimension y thereof, it is determined that the longitudinal direction of the image area 112 is correspondent with the longitudinal direction of the recording area 110 and the determining processing is ended.

In step 304, if it is determined that the horizontal dimension x of the recording area 110 is smaller than the vertical dimension y thereof, it is determined that the longitudinal direction of the image area 112 is not correspondent with the longitudinal direction of the recording area 110 and the routine proceeds to step 310. In step 310 rotating processing is executed, and then the determining processing is ended.

In step 302, if it is determined that the horizontal dimension a of the image area 112 is smaller than the vertical dimension b thereof (i.e., a<b), the routine proceeds to step 308 and it is determined whether the horizontal dimension x of the recording area 110 is larger than the vertical dimension y thereof (i.e., x>y).

In step 308, if it is determined that the horizontal dimension x of the recording area 110 is equal to or smaller than the vertical dimension y thereof, it is determined that the longitudinal direction of the image area 112 is correspondent with the longitudinal direction of the recording area 110 and the determining processing is ended. In step 308, if it is determined that the horizontal dimension x of the recording area 110 is larger than the vertical dimension y thereof (i.e., x>y), it is determined that the longitudinal direction of the image area 112 is not correspondent with the longitudinal direction of the recording area 110 and the routine proceeds to step 310. In step 310 the rotating processing is executed, and then the determining processing is ended.

The rotating processing for images is executed, for example, by lining up pixel data, which has been read in the horizontal direction from the image memory 142, in the vertical direction, and then by storing the lined pixel data again in the image memory 142.

As described above, in accordance with the present embodiment, it is determined whether the longitudinal direction of the image area, which is represented by image data inputted in the image processing section 16, is correspondent with the longitudinal direction of the preset recording area, and if it is not correspondent, the image is rotated by 90 degrees. As a result, there is an advantage that image data can be outputted so that the longitudinal direction of the image area, which is represented by the image data, is always correspondent with the longitudinal direction of the recording area.

In the present embodiment, image is rotated by 90 degrees so that the vertical and horizontal directions thereof are reversed. However, as for the rotating processing, it is sufficient if the longitudinal direction of the image area is made correspondent with the longitudinal direction of the recording area 110, thus the rotating angle for the image area is not limited to 90 degrees. The image area can be further adjusted by enlarging or reducing the image after the rotating processing.

In the above embodiment, an example, wherein the rotating processing in which image is rotated so that the longitudinal direction of the image area is correspondent with the longitudinal direction of the recording area is performed simultaneously with the image processing, is given. However, the present invention can be structured so that the rotating processing is performed in accordance with the set recording area during printing with a printer. This structure is effective especially in a digital copier which includes only a single type of paper tray.

In the above-described embodiment, the image processing apparatus is included in the digital laboratory system. However, the image processing apparatus of the present invention can be structured to be included in the external output-input section 17.

As described above, in accordance with the first aspect of the invention, there is an effect that image data can be outputted so that the longitudinal direction of the image area, which is represented by the image data, is correspondent with the longitudinal direction of the preset recording area.

What is claimed is:

1. An image processing apparatus comprising:

storage means for storing a file image data from an external section;

determining means, which compares dimensions of an image area of the file image represented by inputted image data from the external section with dimensions of a preset recording area for recording the image, and determines whether the dimensions of the longitudinal direction of the image area and the dimension of the longitudinal direction of the recording area are correspondent with each other; and outputting means, which fetches the inputted file image data from the storage means and outputs the image so that the dimension of the longitudinal direction of the image area is adjusted to be correspondent with the dimension of the longitudinal direction of the recording area, when it is determined by said determining means that the dimension of the longitudinal direction of the image area and the dimension of the longitudinal direction of the recording area are not correspondent with each other, wherein the outputted image with adjusted longitudinal dimensions is stored in the storage means.

2. An image processing apparatus according to claim 1, wherein the dimensions of the image area of the image represented by the inputted image data are the number of pixels in the vertical direction and the number of pixels in the horizontal direction of the image represented by the inputted image data.

3. An image processing apparatus according to claim 1, wherein said outputting means rotates and outputs the image so that the dimension of the longitudinal direction of the image area and the dimension of the longitudinal direction of the recording area are correspondent with each other.

4. The image processing apparatus according to claim 3, wherein the output means rotates the file image by 90 degrees so that the vertical and the horizontal directions are reversed.

5. The image processing apparatus according to claim 4, wherein after the file image is rotated further adjustment by enlarging or reducing can be done.

6. The image processing apparatus according to claim 3, wherein the output means rotates the file image so that the longitudinal direction of the image is made substantially parallel to the longitudinal direction of the recording area.

7. The image processing apparatus according to claim 1, wherein the adjusted inputted file image is adjusted by lining up pixel data read from a horizontal direction from the storage means in a vertical direction and then storing the lined pixel data in the storage means.

8. The image processing apparatus according to claim 1, wherein the file image data is generated from the external section being a computer or a digital camera.

9. The image processing apparatus according to claim 1, wherein before the determining means compares dimensions of the image area of the image with dimensions of the preset recording area, the determining means compares the longitudinal direction of the image area and a widthwise direction of the image area.

10. The image processing apparatus according to claim 9, wherein in a case in which the longitudinal direction of the image area is equal to the widthwise direction of the image area, the determining means does not compare dimensions of the image area of the image with dimensions of the preset recording area.

11. The image processing apparatus according to claim 1, wherein when the dimension of the longitudinal direction of the image area is adjusted to be correspondent with the dimension of the longitudinal direction of the recording area, the image area of the image is rotated around the central position of the image area of the image.

12. An image processing apparatus comprising:

determining means, which compares dimensions of an image represented by inputted film image data, the dimensions being obtained on the basis of the number of pixels in the vertical direction and the number of pixels in the horizontal direction of the image data, with dimensions of a preset recording area for recording the image, and determines whether a longitudinal direction of an area of the image represented by the film image data and a longitudinal direction of the recording area are correspondent with each other; and image rotating means, which rotates the image so that the longitudinal directions are correspondent with each other, when it is determined by said determining means that the longitudinal direction of the area of the film image and the longitudinal direction of the recording area are not correspondent with each other.

13. The image processing apparatus according to claim 12, wherein the film image data includes negative images or positive images visualized by developing processing.

14. An image processing method comprising:

obtaining dimensions of an inputted film image data based on the number of pixels in the vertical direction and the number of pixels in the horizontal direction;

comparing dimensions of the inputted film image data with dimensions of a preset recording medium for recording the image;

determining whether a longitudinal direction of an area of the image represented by the inputted film image data and a longitudinal direction of the recording medium are correspondent with each other; and rotating the inputted film image data so that the longitudinal direction is correspondent with the longitudinal direction of the recording medium when it is determined that the longitudinal direction of the area of the inputted film image and the longitudinal direction of the recording medium are not correspondent with each other.

* * * * *